March 11, 1952     S. G. CRANE     2,588,908
ELECTRIC TIMING DEVICE

Filed Aug. 31, 1948     3 Sheets-Sheet 1

INVENTOR.
SAMUEL G. CRANE
BY
George Rex Frye
ATTORNEY

March 11, 1952     S. G. CRANE     2,588,908
ELECTRIC TIMING DEVICE

Filed Aug. 31, 1948     3 Sheets-Sheet 2

Inventor
SAMUEL G. CRANE

George Rex Frye
ATTORNEY

March 11, 1952     S. G. CRANE     2,588,908
ELECTRIC TIMING DEVICE

Filed Aug. 31, 1948     3 Sheets-Sheet 3

INVENTOR
SAMUEL G. CRANE
George Rex Frye
ATTORNEY

Patented Mar. 11, 1952

2,588,908

UNITED STATES PATENT OFFICE 2,588,908

ELECTRIC TIMING DEVICE

Samuel Guy Crane, Omaha, Nebr., assignor of one-half to Claude H. Reed, Omaha, Nebr.

Application August 31, 1948, Serial No. 47,110

2 Claims. (Cl. 161—1)

This invention relates to automatic timing devices for controlling the duration of electrical currents passing to a toaster, a waffle baker, egg cooker or the like, and has for its primary object the provision of a timing device that, except for an initial manual setting for the chosen duration period, is entirely operated by electricity.

Another important object is to provide improved electrically controlled means for timing cooking devices and the like whereby the current passes continually to the cooking device during the selected time period and intermittently through a thermal-responsive element arranged for alternate and repeated heating and cooling to control the operation of the timing device.

A further object is to provide a timing device which may be easily and quickly set to run for any predetermined length of time within its capacity, at the expiration of which it operates switching means to terminate the passage of current to a cooking or other device associated therewith.

A further object is to provide a thermal timing device operating on a heat-up cool-off cycle during its timing operation and which may be electrically connected to any desired cooking device or the like located at a distance from the timer.

A further object is to provide novel timing mechanism for controlling the operation of an electrical device, such as a bread toaster.

Other objects and advantages will be apparent from the following description, wherein reference is made to the accompanying drawings showing a preferred embodiment of my invention, and wherein similar reference numerals designate similar parts throughout the several views.

Figure 6:
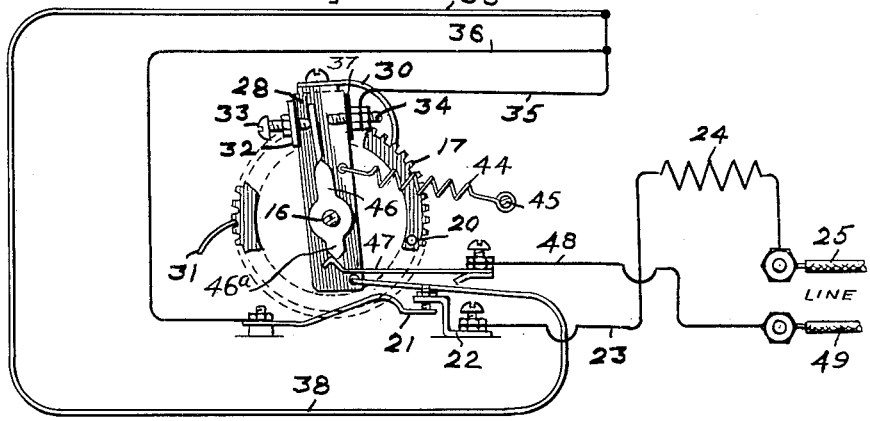
Figure 7:
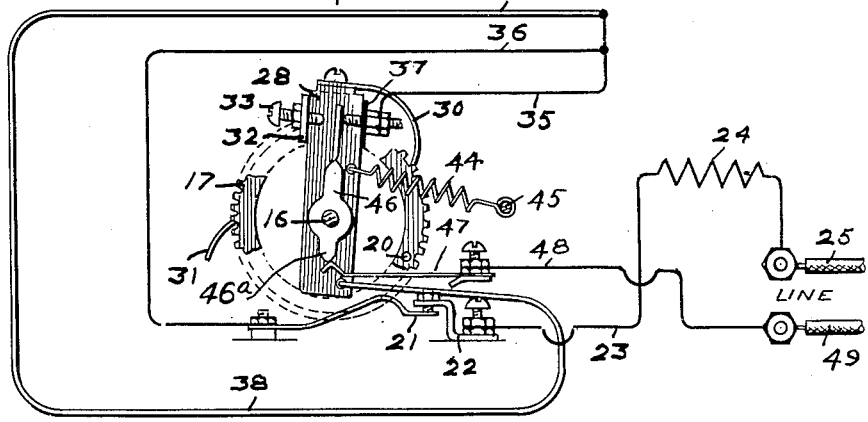
Figure 8:
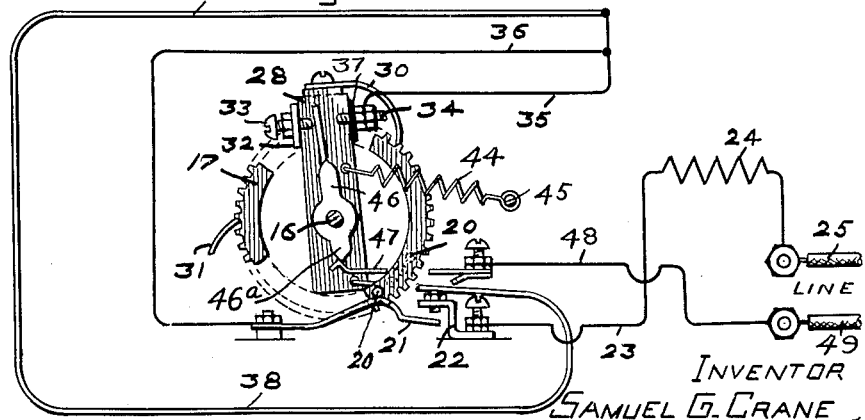

Figs. 6-8 are diagrammatic views showing the electrical circuits in my improved timer, Fig. 6 showing the main switch closed to permit passage of current to the toaster but with the current passing through the hot wire to effect its elongation; Fig. 7 shows the main switch closed to permit flow of current to the toaster but with the current shunted away from the hot wire to effect its contraction, and Fig. 8 shows the main switch open to break the flow of current to the toaster as well as through the timer mechanism.

Figure 1:
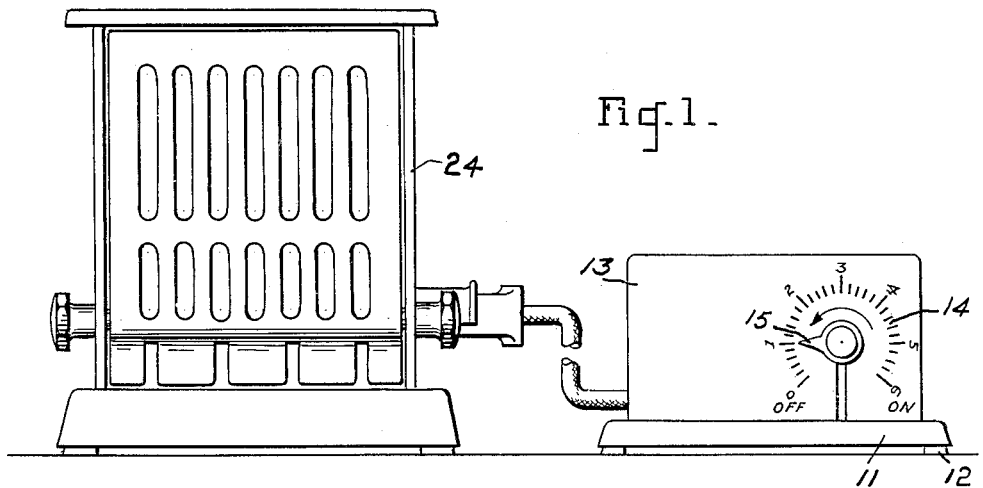
Fig. 1 is a side elevation of my improved electric timer coupled to a conventional toaster.
Figure 2:
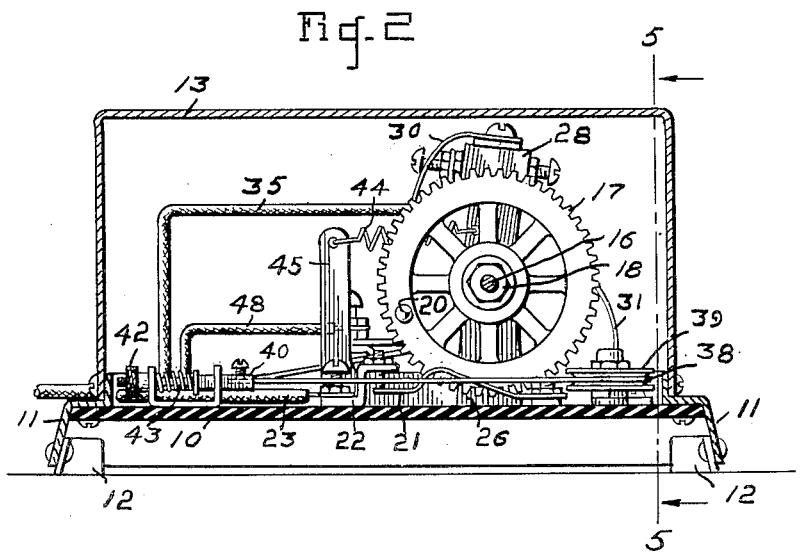
Fig. 2 is a vertical longitudinal section taken substantially on the line 2—2 of Fig. 5.
Figure 3:
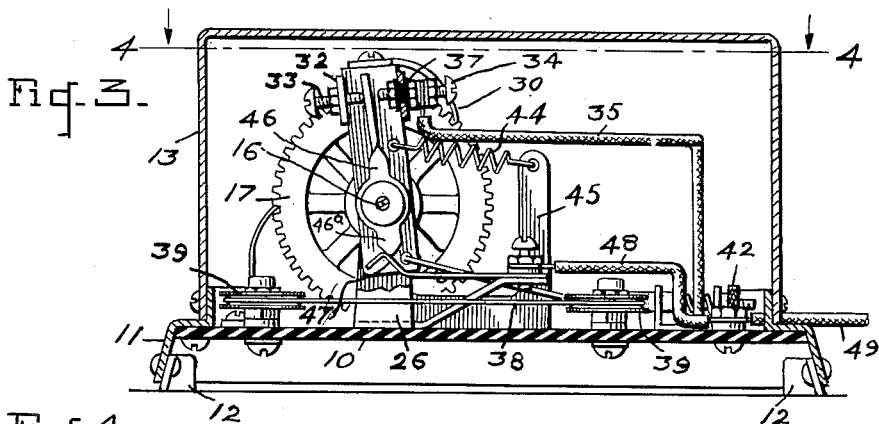
Fig. 3 is a vertical longitudinal section taken substantially on the line 3—3 of Fig. 4.
Figure 4:
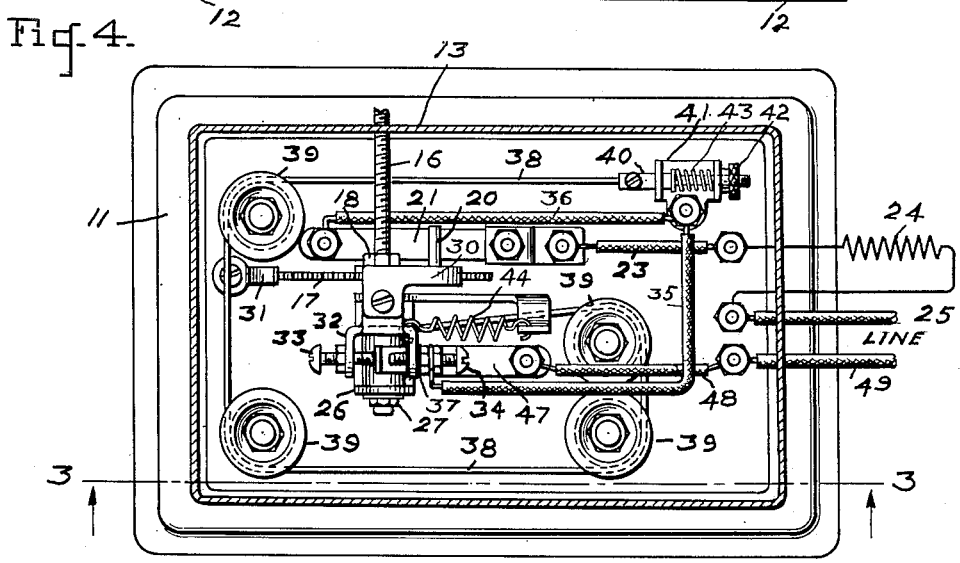
Fig. 4 is a plan view of my timer mechanism, the casing being cut away substantially on the line 4—4 of Fig. 3.
Figure 5:
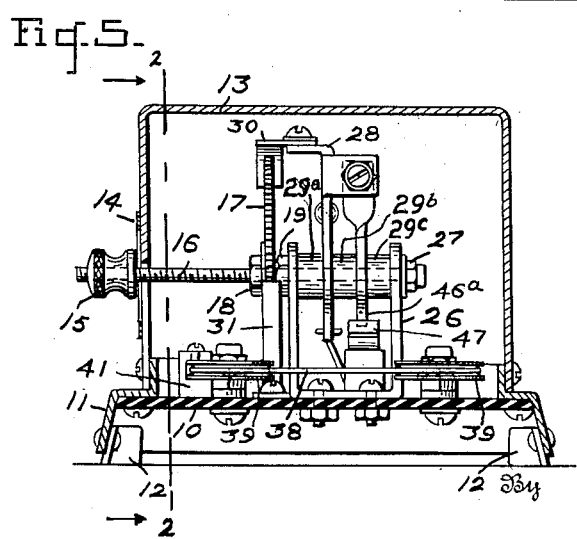
Fig. 5 is a vertical cross-section taken substantially on the line 5—5 of Fig. 2.

Referring now to the drawings, and particularly to Figs. 1-5 thereof, my improved timing mechanism will be seen to be mounted upon a base plate 10 of insulating material secured upon a supporting frame 11, which in turn is carried by corner brackets 12 to space the base plate 10 and the electrical apparatus carried thereby from the table or similar surface on which the timer rests. A casing 13 covers the electric timing mechanism and is detachably secured to supporting frame 11, as by screws or the like. On the front face of casing 13 is mounted a dial 14 with which a pointer 15 carried by a knob turnable to selectively adjust the position of the timing mechanism cooperates to indicate the length of time for which the timer is intended to actuate. The pointer-knob 15 is mounted at the forward extremity of a threaded shaft 16 which also carries a ratchet wheel 17 at a distance from the knob, the ratchet wheel being locked in selected position along shaft 16, as by lock nuts 18 and 19 (Figure 5). A pin 20 projects forwardly from ratchet wheel 17 adjacent its periphery, pin 20 extending sufficiently in advance of wheel 17 to engage the raised central portion of the flexible switch member 21 of the main switch, and depress such flexible switch member when wheel 17 is moved to bring pin 20 into engagement with switch member 21. A fixed switch member 22 cooperates with the flexible switch member 21 and wire 23 directly connects switch member 22 with the toaster 24, also connected to a service line, as by the wire 25. It will be understood that toaster 24 is illustrated and described herein merely as an example of the use of electric current during the period while my timer permits the flow thereof to the selected instrument. Obviously other devices than toasters are useful with my improved timer.

The rear portion of the threaded shaft 16 passes through apertures in the spaced arms of a substantially U-shaped supporting bracket 26 secured upon the base plate 10, a lock nut 27 cooperating with nut 19 (Fig. 5) to hold shaft 16 from longitudinal movement. A rocking lever 28 of metal or other conducting material loosely encircles shaft 16 between the arms of the bracket 26 so as to oscillate on shaft 16 during the operation of the timer, spacers 29a and 29b being arranged on opposite sides of the rocking lever to maintain it in desired position along shaft 16. Rocking lever 28 carries at its upper extremity pawl 30 arranged to successively engage the teeth of ratchet wheel 17 (Figs. 2 and 3) and partially rotate such wheel whenever lever 28 is swung in one direction while riding over one tooth of such wheel whenever lever 28 is swung in the other direction. A pawl 31 fixed upon base plate 10 is arranged to prevent retrograde movement of ratchet wheel 17 during this action.

Rockshaft 28 also carries adjacent its upper extremity a pair of spaced adjustable contact members or abutments 33 and 34 for engagement by a swinging rocker arm, as hereinafter described. As shown, abutments 33 and 34 are mounted in ears 32 extending rearwardly from the sides of rocking lever 28, but obviously other means of mounting such abutments may be used.

Abutment 33 is threaded into one ear 32 and suitably locked in any desired adjusted position. No electric wire is connected thereto. Abutment 34, however, is adjustably mounted in a block of insulating material 37 carried by the other ear 32, and connected by shunt circuit wire 35 (Figs. 3 and 6) with the wire 36, the other extremity of which is connected to the main switch member 21. Accordingly, member 34 serves both as an abutment and as an electric contact member during the passage of current through the shunt circuit, at which time the hot wire 38 is contracting while cooling off. Hot wire 38 is formed of any suitable thermally-responsive material, such as Nichrome, and is arranged to afford comparatively great length in a relatively small space to enable rapid elongation and contraction to the extent needed to control the swinging movements of rocking lever 28. As herein shown, hot wire 38 is secured at one extremity to the lower arm of rocking lever 28 (Figs. 3 and 6) and passes over a plurality of pulleys 39 arranged to guide it in its circuitous path around the major portions of three sides of the timing device (Fig. 4). The other extremity of hot wire 38 is secured to a rod 40 adjustably mounted in bracket 41 carried by the base plate 10, as by a knurled nut 42 threaded upon an extremity of rod 40 and engaging a bracket arm.

A spring 43 encircling rod 40 and arranged between such bracket arm and a shoulder on rod 40 tends to hold nut 42 in firm engagement with the bracket arm and anchor the rod end of hot wire 38 so as to enable use of full expansive and contractible movements of such wire at the end thereof which is connected to rocking lever 28.

A coil spring 44 is arranged between the upper arm of rocking lever 28 and a post 45 (Fig. 3) so as to exert a pull on such lever sufficient to swing the upper portion thereof toward post 45 to the extent permitted by the elongation of hot wire 38 during the heating-up portion of its cycle. The strength of spring 44, however, is arranged, either by selection or adjustment, so as to permit the movement of the upper arm of lever 28 in the opposite direction because of the pull exerted on the lower arm of such lever by the contraction of hot wire 38 during the cooling-off period of its cycle. The distance between the pivot of lever 28 and the point of connection of spring 44 with the upper arm of the lever may also be varied to afford a delicacy of adjustment to obtain the desired balance between the pulls exerted by spring 44 and hot wire 38 on the rocking lever. Similarly, the point of connection of hot wire 38 with the lower arm of lever 28 may be varied to or from the pivot of the lever to exert the desired pull thereon during contraction of the hot wire 38.

Mounted to oscillate on shaft 16 under control of rocking lever 28 is a rocker arm 46 (Figs. 3 and 5) suitably positioned along shaft 16, as by spacers 29b and 29c, to alternately engage the abutments 33 and 34 as the lever 28 is swung in opposite directions. As best shown in Fig. 3, the abutments 33 and 34 are contacted by the upper portion of rocker arm 46, and the lower extremity of rocker arm 46 is formed with a substantially V-shaped nose 46a positioned to maintain constant contact with the inverted V portion, adjacent one end of spring contact member 47, the other end of which is connected, as by wire 48, with the service line 49 paralleling service line 25 (Figs. 4 and 6). When the left inclined face of rocker arm nose 46a engages the right inclined face of the inverted V portion of spring contact 47, as shown in Figs. 3 and 6, the upper portion of rocker arm 46 will be held in contact with abutment 33. Then as the upper portion of rocking lever 28 is pulled by spring 44 towards the right in Fig. 3 during elongation of hot wire 38 the apices of nose 46a and the V portion of spring contact 47 will gradually approach alignment with consequent depression of spring contact 47, whereupon a slight further pull by spring 44 will swing the apex of nose 46a beyond the apex of the spring V portion and the depressed spring will rebound to quickly snap the upper portion of rocker arm 46 into contact with abutment 34, the right inclined face of nose 46a then engaging the left inclined face of the spring 47, substantially as shown in Fig. 7, and maintaining contact with abutment 34 until a similar passing of the apices of the V portions during the return swing of rocking lever 28 snaps rocker arm 46 over into contact with abutment 33.

The quick snap action of rocker arm 46 in both directions is beneficial in avoiding sparking and also in enabling a sharp movement of pawl 30 to partially rotate the ratchet wheel 17 or move into engagement with the next tooth on such wheel.

The operation of my improved timer is believed to be apparent. When it is desired to use toaster 24 the knob 15 is rotated to set the pointer to the desired time indication on dial 14. This turns ratchet wheel 17 to move pin 20 out of engagement with the flexible switch member 21, which snaps into contact with fixed switch member 22 to close the circuit through toaster 24 and the timing mechanism. As best shown in Fig. 6, the current passes from service line 25 to toaster 24, to main switch 21, 22, through wire 36, and, since it cannot pass through shunt circuit wire 35 because rocker arm 46 is spaced from contact 34, the current passes through hot wire 38, portions of lever 28, shaft 16 and lever nose 46a, to spring contact 47, and thence through wire 48 to parallel service line 49. This elongates the hot wire 38, permitting spring 44 to eventually swing lever 28 over into the position shown in Fig. 7 with the rocker arm 46 engaging abutment 34 to afford a shunting of the current away from hot wire 38, and enabling passage of the current from wire 36 directly through wire 35, abutment 34, and rocker arm 46, into spring contact member 47.

At each rocking of lever 28 from the position shown in Fig. 6 to that shown in Fig. 7, the ratchet wheel 17 is advanced one tooth through pawl 30. The current passes continually through the toaster 24 during both the heating-up and cooling-off periods of each cycle, and when a sufficient number of cycles have been completed to return pin 20 on ratchet wheel 17 to its original position it will dislodge flexible switch member 21 from fixed switch member 22 to break the circuit. Fig. 8 shows this open main switch position, and the pin 20 is shown therein in full line position at the bottom of its movement and in a plurality of dotted line positions to illustrate successive positions assumed as it approaches the switch opening.

The comparatively great length of the hot wire 38 and the adjustability of its anchored end tends toward long life of my improved timing device, with ready correction of any maladjustments due to wear, slippage, etc. The snap action of rocker arm 46 and the adjustability of the abutments 33 and 34 with which its cooperates also tend to increase the useful life of the timer with ready maintenance of desired positions for most efficient operation.

While the illustrated embodiment herein described is well calculated to adequately fulfill the objects and advantages herein stated, it is to be understood that the invention is susceptible to variation, modifications and change within the spirit and scope of the subjoined claims.

I claim:

1. In an electric timing device, a rocking lever, a spring attached to one arm of said lever constantly exerting a pull upon said arm in one direction, a thermally expansible and contractible member attached to the other arm of said lever and arranged to exert a pull upon the lever during its contractive movements opposite to that exerted by said spring, a long circuit which includes said member, a short circuit separate from said member, and means actuated by the rocking movements of said lever for alternately directing the current through said long and short circuits, said means including a pair of spaced abutments carried by the rocking lever and a rocker arm pivoted coaxially with the lever and swung from one abutment to the other during said rocking movements.

2. In an electric timing device, a rocking lever, a spring attached to one arm of said lever constantly exerting a pull upon said arm in one direction, a thermally expensible and contractible member attached to the other arm of said lever and arranged to exert a pull upon the lever during its contractive movements opposite to that exerted by said spring, a long circuit which includes said member, a short circuit separate from said member, and means actuated by the rocking movements of said lever for alternately directing the current through said long and short circuits, said means including a pair of spaced abutments carried by the lever and a rocker arm pivoted coaxially with the lever and swung from one abutment to the other during said rocking movements, said rocked arm being formed with a nose portion, and a resilient current-carrying member having an inverted V-portion engaging said nose portion on opposite sides of its center during said rocking movements to snap said rocker arm from one abutment to the other.

SAMUEL GUY CRANE.

REFERENCES CITED

The following references are of record in the file of this patent:

UNITED STATES PATENTS

| Number | Name | Date |
|---|---|---|
| 1,745,934 | Kauch et al. | Feb. 4, 1930 |
| 2,221,863 | Crane | Nov. 19, 1940 |
| 2,388,641 | Myers | Nov. 6, 1945 |